United States Patent
Gara

(10) Patent No.: US 7,206,362 B2
(45) Date of Patent: Apr. 17, 2007

(54) BINARY DATA TRANSMISSION ON A SINGLE INFORMATION CHANNEL

(75) Inventor: Alan Gene Gara, Mount Kisko, NY (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 09/779,038

(22) Filed: Feb. 8, 2001

(65) Prior Publication Data

US 2002/0106037 A1 Aug. 8, 2002

(51) Int. Cl.
*H03D 1/00* (2006.01)
*H04L 27/06* (2006.01)

(52) U.S. Cl. .................. 375/341; 375/342; 375/343

(58) Field of Classification Search ........... 375/286, 375/287, 288, 317, 340, 319, 289, 310, 341, 375/342, 343, 348, 349, 350, 360, 264, 260, 375/282; 714/810; 370/474, 476, 470, 472
See application file for complete search history.

(56) References Cited

U.S. PATENT DOCUMENTS

| | | | | |
|---|---|---|---|---|
| 4,096,526 A | * | 6/1978 | Furuta | 358/426.15 |
| 5,255,287 A | * | 10/1993 | Davies et al. | 375/287 |
| 5,946,355 A | * | 8/1999 | Baker | 375/286 |

* cited by examiner

Primary Examiner—Jean B. Corrielus
Assistant Examiner—Qutub Ghulamali
(74) Attorney, Agent, or Firm—Thomas A. Beck; Daniel P. Morris

(57) ABSTRACT

In the invention, it becomes possible to extract all clock information data processing data by simultaneously comparing first, second and third voltage levels to each data bit in clocked time increments wherein the magnitude of the increments is such that each binary data bit is in two of the three voltage levels and all data bits change each clock cycle, so that reconstructed signals of the binary information only may then be assembled based on a signal amplitude that is greater than a low threshold value that is less than the transition between the first and the second of the voltage levels and is less than a high threshold that is greater than the transition between the second and the third voltage levels. The reconstructed data signals are further shaped to be precise in timing, free of skewing and within the system clock.

16 Claims, 3 Drawing Sheets

FIG.1A
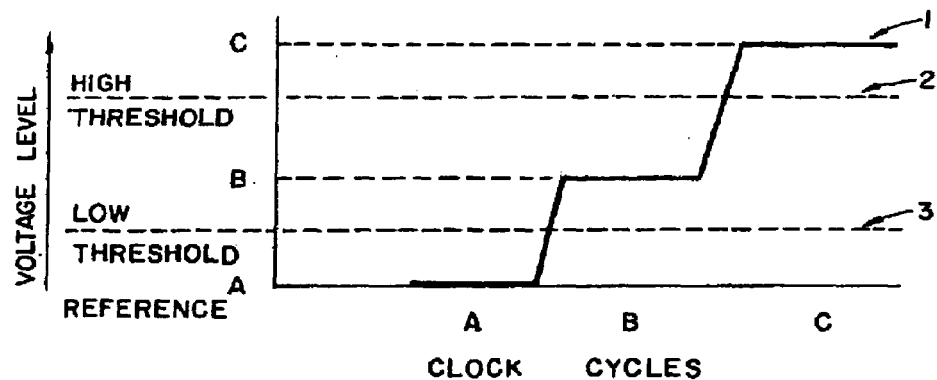
FIG.1B
| PREVIOUS STATE | CURRENT STATE | | |
|---|---|---|---|
| | A | B | C |
| A | x | 0 | 1 |
| B | 0 | x | 1 |
| C | 0 | 1 | x |
FIG.1C
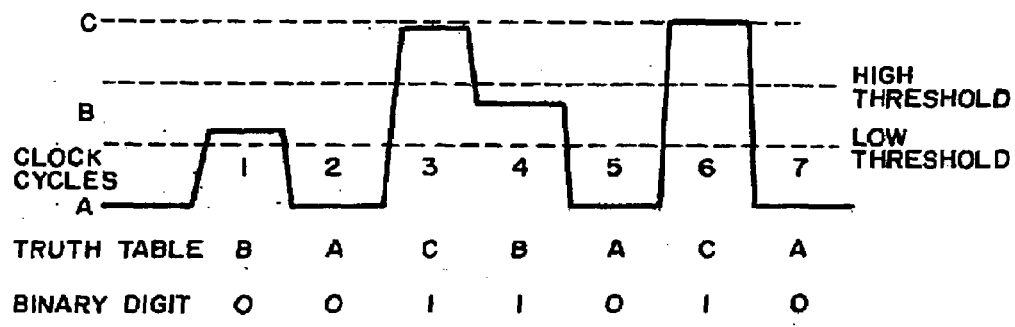

BINARY DATA TRANSMISSION ON A SINGLE INFORMATION CHANNEL

FIELD OF THE INVENTION

The invention is in the field of the transmission of data in data processing and communication systems, and in particular to a system for the transmission of a higher number of bits per second per signal.

BACKGROUND

As progress in the art of binary data processing proceeds, that data must be transmitted and processed at ever increasing rates. There have been developed in the art, both serial and parallel types of data processing systems, each with unique considerations in their individual structure, however, in both types of systems a fundamental goal has been the achievement of the transmission of higher numbers of binary bits per signal.

In serial types of systems there is a constraint in that a single signal must handle both the information signals and the clock. The solution in the art has been to use a phase locked loop, however the time that must be allotted for a phase lock related signal is characteristically very long compared to a bit time. The time difference complicates timing and frequently makes serial communication systems impractical. The phase locked loop also precludes bidirectional use of a serial channel In parallel types of systems a clock signal can be separated from the data signal but here a downside aspect exists in the timing considerations of the clock and the data.

In all systems at the present state of the art further constraints are encountered where in processing there is skewing of the shape of the data bits. Periodically, in present systems, steps for restoration of timing precision and bit reshaping must be employed.

SUMMARY OF THE INVENTION

In the invention, it becomes possible to extract all clock information in clocked in time binary information signals on a single conductor by simultaneously sampling and comparing a first, second and third voltage level to each data bit in clocked time increments wherein the magnitude of the increments is such that each binary data bit is in two of the three voltage levels and all data bits change each clock cycle. Reconstructed signals of the binary information may then be assembled based on a signal amplitude that is greater than a low threshold value that is less than the transition between the first and the second of the voltage levels; and further is less than a high threshold value that is greater than the transition between the second and the third voltage levels. The reconstructed data signals are then further shaped to be precise in timing and free of skewing.

BRIEF DESCRIPTION OF THE DRAWINGS

FIG. 1 is a relational depiction the informational effects of the use of multiple voltage levels and the facilitation of the extraction of the clock and bit reconstruction in accordance with the invention: in which, FIG. 1A is a graph relating the three voltage levels to the state of the data;

FIG. 1B is a three voltage level truth table relating the current state and the previous state of the data; and, FIG. 1C is a correlated depiction of change in voltage level with state indicator and with binary bit value.

DESCRIPTION OF THE INVENTION

Figure 2A:
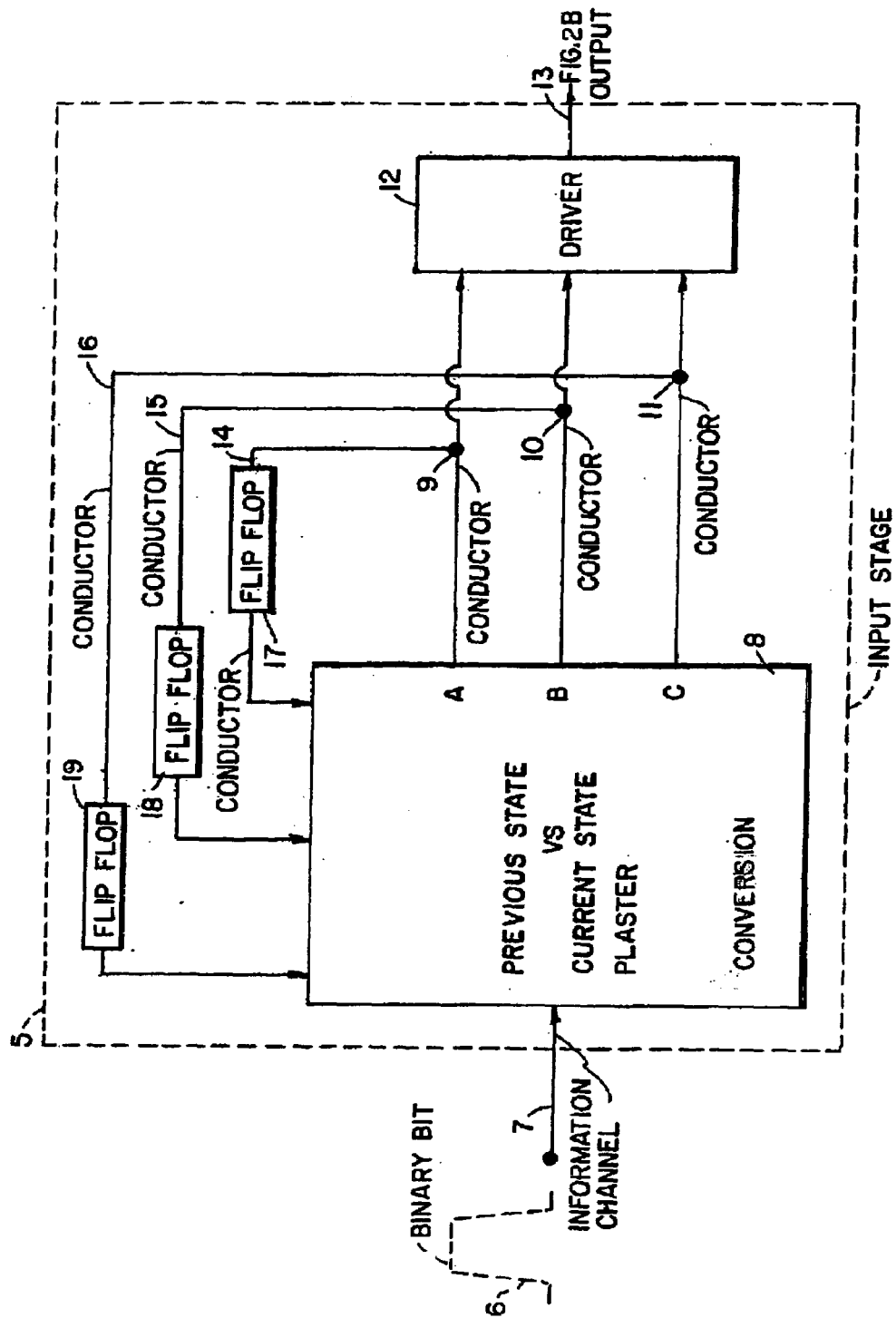
FIG. 2A is a functional block diagram of the input stage of the present invention.

The invention through the use of multiple voltage levels permits the assembling of an arrangement wherein all data bits change on every system clock cycle. This in turn permits the insertion and extraction of the clock information in the data and also permits the using of local circuitry structure in the reconstruction of the data including the shaping and positioning of each output data bit at the optimum time.

In accordance with the invention each data bit of the binary input data is converted to a three voltage level signal, with a change in voltage level at every system clock cycle. The change in voltage level correlated with logic and the fact that there is a change every clock cycle permits the clock information to be extracted from the binary data bit information. The binary data is then reconstructed between precise levels and with subsequent precision timing and pulse shape.

Referring to FIG. 1 there is shown a relational depiction of how the changing of each bit, each system clock cycle, together with the three voltage level arrangement with respect to the reference, permits the extraction of the clock information and the precise reconstruction of the data. In FIG. 1A a graph is provided that illustrates the relationship of the three voltage levels "a", "b" and "c" in the analog signal 1, to the system clock cycles, and with the level "a" coinciding with the reference voltage. High and low threshold levels 2 and 3 respectively, for the binary bit data to be reconstructed are shown. The high threshold voltage level 2 is higher than the "b" to "c" voltage level transition and the low threshold level 3 is lower than the "a" to "b" voltage level transition.

In FIG. 1B there is shown a truth table comparison of the current state of the data with the immediate previous state in which the "a", "b" and "c" voltage levels of the current state are listed as columns and the "a", "b", and "c" levels of the previous state are listed as rows; so that as each bit changes each clock cycle, a different binary digital value occurs. In the truth table of FIG. 1B there are, at intersections of the same letter, a designation "x" or not allowed, as this does not involve a voltage level change. A change from level "a" in the previous stage to level "b" in the current stage corresponds to a binary bit with a digital 0 value being transferred.

In FIG. 1C the effect of the voltage excursion, as the clock cycles pass, is correlated with the truth table letters and the corresponding binary bit digital values. The data is sampled at each voltage transition, with the resulting signals being only the binary data bits, with the clock related signals having been eliminated.

Figure 2B:
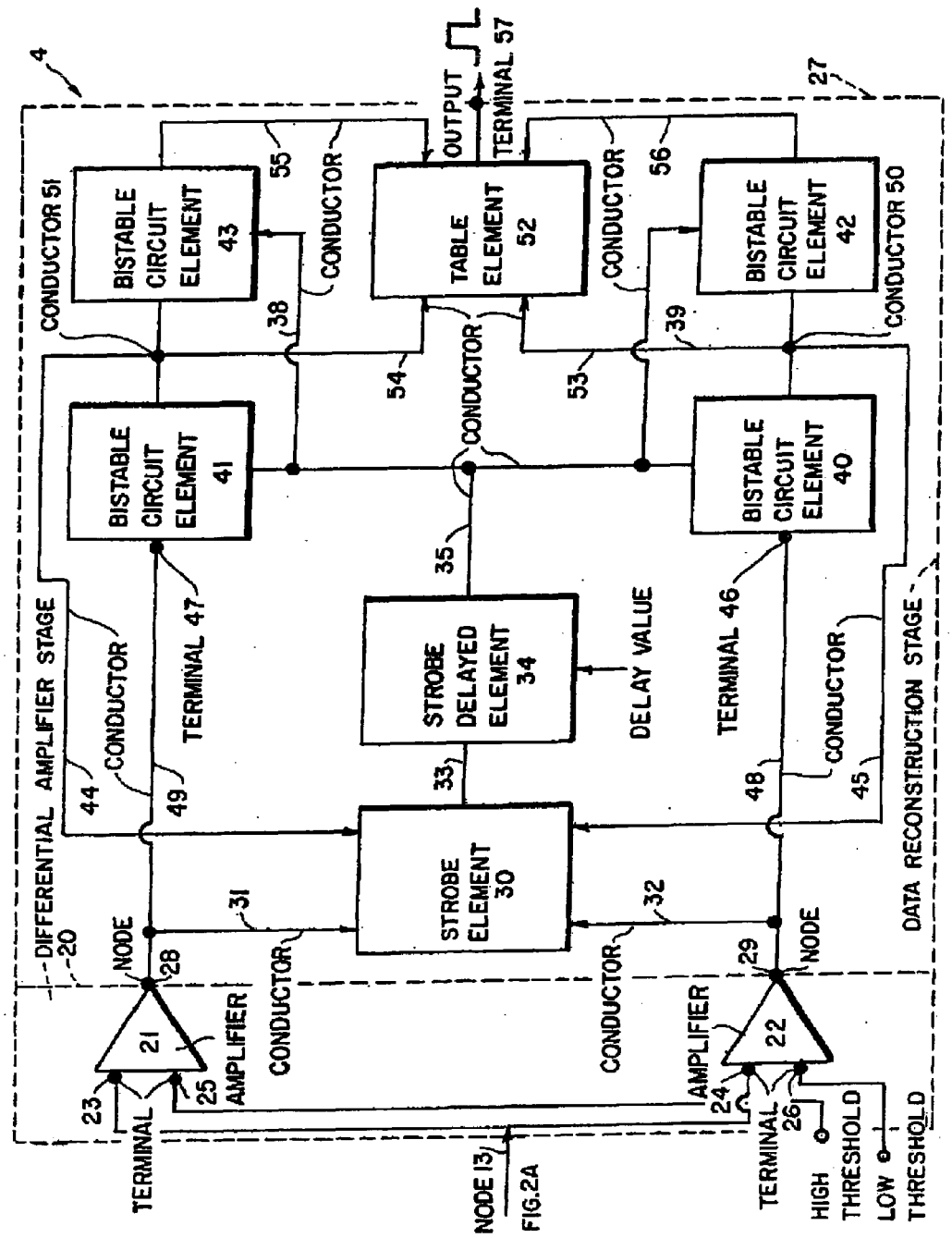
FIG. 2B is a functional block diagram of the differential amplifier stage of the present invention.

In FIG. 2A and 2B there is shown a functional block diagram of the features that would be in an implementation of the invention involving the use of multiple voltage levels and the fact that every bit changes each cycle in the extraction of the clock information and the subsequent reconstruction of the data in accordance with the invention.

The individual functional blocks in FIG. 2A and 2B are made up of, standard in the art, components such as binary logic elements such as bistable devices, latches, gates and buffers.

Referring to FIG. 2A the overall element 4, includes an input stage labelled element 5, wherein the binary data with respect to reference and depicted as a binary bit and labelled as element 6 is received through an information channel labelled 7 for processing in a conversion element labelled 8. In the course of processing binary data bits undergo shape decay in amplitude and rise and fall, generally referred to in the art as skew and jitter. The shape decay is depicted with respect to element 6 as a dotted outline. The conversion element 8 serves the function of a lookup table raster of the truth table type, that relates the immediate previous state of the input data at outputs "a", "b", and "c", only one of which is true, through conductors 9, 10 and 11 into the three level driver 12, from which there is provided, at output 13, the three level analog voltage signal 1 that is depicted in FIG. 1A. The table lookup feature of element 8, which is first set using the "current" state values followed by setting in the "previous" state values, is updated for each binary bit through conductors 14, 15 and 16 with bistable elements or flip flops 17, 18 and 19 respectively to reset in the previous stage lookup table in element 8 the one true value transmitted through output 13, under a system clock, not shown.

Continuing with FIG. 2B the analog voltage signal 1 delivered at node 13 is introduced into a differential amplifier stage 20 made up of amplifier members 21 and 22 at input terminals 23 and 24, and compared with the thresholds 2 and 3 of FIG. 1, through terminals 25 and 26 respectively, in the data reconstruction stage 27.

In reconstructing the data bit, it is desirable that any decay in the duration, the amplitude and the skew that has occurred in earlier processing as indicated by the dotted borders of the example data bit element 6 in FIG. 2A, be eliminated; and that each resulting data bit be optimally positioned with respect to the system clock. All data adjustment is accomplished in the circuitry in the immediate vicinity.

A strobe function is provided that detects each data bit, and provides a shaped data bit signal that is optimally centered in the timing window of the system as determined by the system clock. This is accomplished the providing of a strobe element 30 that detects each data bit signal, on conductors 31 and 32, one of which will necessarily transition, and provides a signal, through conductor 33, that is delayed in element 34, so as to deliver a signal through conductors 35, 36, 37, 38 and 39 to actuate the "current" state indicating, and the "previous" state indicating, bistable circuit element pairs 40 and 41 and 42 and 43 respectively, on the leading edge of the system clock timing window. The delay, usually set in as a value in element 34, is about one half the timing window duration, which removes most jitter and skew in each output bit. A more extensive selectable delay value can be arranged for insertion into element 34 through the use of a programmable multi tap delay line element, not shown. A reset that is between bit signals is provided to element 30 through conductors 44 and 45 after the actuation of the "current" flip flop pair 40 and 41.

The signal between nodes 28 and 29 is provided to the "current" state flip flop pair 40 and 41 at terminals 46 and 47 on conductors 48 and 49 respectively, and, after an actuation delay of flip flop pair 40 and 41, to the "previous" state flip flop pair 42 and 43 on conductors 50 and 51 respectively.

The centering of the reconstructed data bit to be delivered at the output requires a finite amount of time and should be adjusted to be at the timing of the system clock. The information is arranged in a "current" state vs "previous" state look up table element 52. The "current" state information is transferred to the element 52 on conductors 53 and 54 respectively and the "previous" state information is transferred to the lookup table element 52 on conductors 55 and 56 respectively. The output is delivered at output terminal 57.

The signalling capability of the invention provides the advantages in a data processing system of having the resulting system be locally be self contained so that long line lock times are avoided, that clock distribution noise and jitter are minimized, and that bit signal deterioration becomes readily repairable.

What has been described is the use on a single information channel of multiple voltage levels in an arrangement where all data bits change every cycle to permit extraction of clock information and complete reconstruction locally of each data bit free of all previous processing deterioration.

What is claimed is:

1. In the transmission of clocked time binary information signals with respect to a single reference level in a single information channel where said binary information signals are positioned between beginning and end phase shift signals, an improvement for extraction of said phase shift signals a system comprising in combination:

means for arranging said binary information signals in serial relation to first, second and third voltage levels in said clocked time increments wherein each binary information signal is in two of said three voltage levels, such that there is a change in voltage level at every system clock cycle, said change in voltage level being correlated with logic and that there is a change every clock cycle which permits clock information from binary data bit voltage level information, said binary data then being reconstructed between precise levels and with subsequent precision timing and pulse shape, and means for producing a new signal for each of said binary information signals that is based on an amplitude of a signal of said binary information signals that is greater than a low threshold that is less than the transition between said first and said second of said voltage levels and is less than a high threshold that is greater than the transition between said second and said third voltage levels.

2. The improvement of claim 1 wherein said means for arranging said binary information signals in serial relation to said first, second and third voltage levels includes a three level driver.

3. The improvement of claim 2 wherein said means for producing a new signal for each of said binary information signals that is based on an amplitude of a signal that is greater than a low threshold that is less than the transition between said first and said second of said voltage levels and is less than a high threshold that is greater than the transition between said second and said thrid voltage levels as one reference and said low threshold as the other reference level.

4. The improvement of claim 3 wherein said means for producing a new signal includes means for reflecting "current" and "previous" data in relating said new signal to said clocked time.

5. The improvement of claim 4 wherein said means for electing "current" and "previous" data is a look-up table with said "previous" data provided from said "current" data with a one clock time cycle delay.

6. A clock time binary information processing apparatus comprising:

the arranging of said binary information signals in serial relation to first, second and third voltage levels in said clocked time increments wherein each binary information signal is in two of said three voltage levels, such that there is a change in voltage level at every system clock cycle, said change in voltage level being correlated with logic and that there is a change every clock cycle which permits clock information from binary data bit voltage level information, said binary data then being reconstructed between precise levels and with subsequent precision timing and pulse shape, and producing a new signal for each of said binary information signals that is based on an amplitude of a signal of said binary information signals that is greater than a low threshold that is less than the transition between said first and said second of said voiltage levels and is less than a high threshold that is greater than the transition between said second and said third voltage levels and the processing of said new signal in a differential amplifier between said high and said low threshold values.

7. The clocked time binary information processing of claim 6 including an additional step of further position processing of said new signal with respect to said clocked time.

8. The clocked time binary information processing of claim 7 wherein said additional step is a signal positioning of said new signal at the leading edge of said clocked time.

9. The method of removal of clock timing information and signal reshaping in binary data comprising the steps of:
    arranging said binary data in serial binary bits,
    passing each bit in relation to first, second and third voltage levels, wherein each binary bit signal extends into two of said voltage levels such that there is a change in voltage level at every system clock cycle, said change in voltage level being correlated with logic and that there is a change every clock cycle which permits clock information from binary data bit voltage level information, said binary data then being reconstructed between precise levels and with subsequent precision timing and pulse shape, and
    producing a new signal for each bit that is within an amplitude range that is greater than a low threshold value that is less than a transition value between said first and said second of said voltage levels and is less than a high threshold value greater than the transition value between said second and said third voltage levels, and,
    positioning said new signal in relation to the leading edge of the next clock timing signal.

10. A Data transmission apparatus for the transmission of binary data bits between first and second nodes, comprising in combination:
    an input stage operable to receive a binary information signal at a first transmission node, said input stage being adapted to deliver a three voltage level driver signal at an intermediate circuit node,
    said three voltage level driver signal having serially, in a first clock cycle increment, a first voltage level corresponding to the system reference voltage,
    in a second clock cycle increment, a second and intermediate voltage level and, in a third clock cycle increment corresponding to a third and highest voltage level,
    a comparator stage wherein said three level driver signal is compared in separate parallel first and second reference voltage comparison amplifiers each having said three level driver signal introduced at one input thereto;
    a first reference voltage comparison amplifier having introduced at the remaining input a low threshold voltage that is higher than said reference voltage and is less than said intermediate voltage, and,
    a second reference voltage comparison amplifier having introduced at the remaining input a high threshold voltage that is higher than said intermediate voltage and is less than said third voltage; and
    a binary information signal reconstruction stage responsive to output signals from said first and second comparison amplifiers and adapted to establish the shape of an output binary bit signal;
    such that there is a change in voltage level at every system clock cycle, said change in voltage level being correlated with logic and that there is a change every clock cycle which permits clock information from binary data bit voltage level information, said binary data then being reconstructed between precise levels and with subsequent precision timing and pulse shape.

11. The data transmission apparatus of claim 10 wherein said reconstruction stage includes delay means to position said output signal with respect to a clock for said data transmission system.

12. The data transmission apparatus of claim 11 wherein said reconstruction stage includes variable delay means to position said output signal within a window established by said clock for said data transmission system.

13. The data transmission apparatus of claim 12 wherein said reconstruction stage includes bistable circuit means establishing output signal turn-on.

14. The data transmission apparatus of claim 13 wherein said reconstruction stage produces a new signal, the magnitude of which is within an amplitude range that is greater than a low threshold value that is less than an intermediate voltage value that is between said first and said second of said voltage levels, and is less than a high threshold value that is greater than said intermediate voltage, and positioning said new signal in relation to the leading edge of the next clock timing signal.

15. In the transmission of clocked time binary information signals with respect to a single reference level in a single information channel where said binary information signals are positioned between beginning and end phase shift signals,
    an improvement for extraction of said phase shift signals comprising in combination:
    means for arranging said binary information signals in serial relation to first, second and third voltage levels in said clocked time increments wherein each binary information signal is in two of said three voltage levels, such that there is a change in voltage level at every system clock cycle, said change in voltage level being correlated with logic and that there is a change every clock cycle which permits clock information from binary data bit voltage level information, said binary data then being reconstructed between precise levels and with subsequent precision timing and pulse shape, and
    means for producing a new signal for each of said binary information signals that is based on an amplitude of a signal of said binary information signals that is greater than a low threshold that is less than the transition between said first and said second of said voltage levels and is less than a high threshold that is greater than the transition between said second and said third voltage levels, said means including means for reflecting "current" and "previous" data in relating said new signal to said clocked time; and said means for reflecting "current" and "previous" data is a look-up table with said "previous" data provided from said "current" data with a one clock time cycle delay.

16. A Data transmission apparatus for the transmission of binary data bits between first and second nodes, comprising in combination:
   an input stage operable to receive a binary information signal at a first transmission node, said input stage being adapted to deliver a three voltage level driver signal at an intermediate circuit node,
   said three voltage level driver signal having serially, in a first clock cycle increment, a first voltage level corresponding to the system reference voltage,
   in a second clock cycle increment, a second and intermediate voltage level and, in a third clock cycle increment corresponding to a third and highest voltage level,
   a comparator stage wherein said three level driver signal is compared in separate parallel first and second reference voltage comparison amplifiers each having said three level driver signal introduced at one input thereto;
   a first reference voltage comparison amplifier having introduced at the remaining input a low threshold voltage that is higher than said reference voltage and is less than said intermediate voltage, and,
   a second reference voltage comparison amplifier having introduced at the remaining input a high threshold voltage that is higher than said intermediate voltage and is less than said third voltage; and
   a binary information signal reconstruction stage responsive to output signals from said first and second comparison amplifiers and adapted to establish the shape of an output binary bit signal; such that there is a change in voltage level at every system clock cycle, said change in voltage level being correlated with logic and that there is a change every clock cycle which permits clock information from binary data bit voltage level information, said binary data then being reconstructed between precise levels and with subsequent precision timing and pulse shape;
   said binary information reconstruction stage includes: (a) delay means to position said output signal with respect to a clock for said data transmission system; (b) variable delay means to position said output signal within a window established by said clock for said data transmission system and (c) bistable circuit means establishing output signal turn-on.

* * * * *